US012098564B2

(12) United States Patent
Dvorak et al.

(10) Patent No.: US 12,098,564 B2
(45) **Date of Patent: *Sep. 24, 2024**

(54) PATRON-ACCESSIBLE MEMORIALIZATION STRUCTURES

(71) Applicant: MATTHEWS INTERNATIONAL CORPORATION, Pittsburgh, PA (US)

(72) Inventors: Edward Dvorak, San Jacinto, CA (US); Wendell DeMent, III, San Jacinto, CA (US); William Cone, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,712

(22) Filed: Feb. 27, 2023

(65) Prior Publication Data

US 2024/0018799 A1 Jan. 18, 2024

Related U.S. Application Data

(63) Continuation of application No. 17/563,240, filed on Dec. 28, 2021, now Pat. No. 11,591,818, which is a continuation of application No. 14/639,315, filed on Mar. 5, 2015, now abandoned.

(60) Provisional application No. 61/948,524, filed on Mar. 5, 2014.

(51) Int. Cl.
*E04H 13/00* (2006.01)
*E05B 65/00* (2006.01)

(52) U.S. Cl.
CPC ......... *E04H 13/006* (2013.01); *E04H 13/003* (2013.01); *E04H 13/008* (2013.01); *E05B 65/0057* (2013.01)

(58) Field of Classification Search
CPC ... E04H 13/003; E04H 13/006; E04H 13/008; E05B 65/0057
USPC ........................................................... 52/103
See application file for complete search history.

(56) References Cited

U.S. PATENT DOCUMENTS 3,925,944 A * 12/1975 Pickel .................. E04H 13/006 52/133
3,945,094 A * 3/1976 Daran .................. E04H 13/005 52/129
4,463,527 A * 8/1984 Schlosser ............ A01G 27/005 47/79

(Continued)

*Primary Examiner* — James J Buckle, Jr.
(74) *Attorney, Agent, or Firm* — DLA Piper LLP (US)

(57) ABSTRACT

Memorialization structures, niches, and methods for manufacturing niches having a recess or cavity that is accessible after installation of the memorialization structures and/or post-burial or post-entombment of a deceased are generally described. In some embodiments, a memorialization niche may include a recess and a door configured to enclose the recess. The door may include a lock configured to prevent public access to the recess. A patron associated with the niche may unlock the door and access the recess. The patron may remove objects from and/or insert objects into the recess post-burial or -entombment of the deceased without disturbing the memorialization structure and/or adjacent memorialization structures and/or requiring a memorial operator to unseal the recess. Accordingly, the patron may continually update the personalization effects of a memorialization structure and achieve a dynamic memorial for the deceased while maintaining the security of any bodily remains and/or personal objects stored in the recess.

16 Claims, 4 Drawing Sheets

(56) References Cited

U.S. PATENT DOCUMENTS 4,607,417 A * 8/1986 Hancovsky ............ A61G 17/08 27/7
5,217,622 A * 6/1993 Flores ................... E04H 13/005 55/315
5,546,710 A * 8/1996 Barry .................... E04H 13/003 52/157
5,740,637 A * 4/1998 Snow .................... E04H 13/006 52/603
5,894,699 A * 4/1999 Fulton ................... E04H 13/006 52/134
5,899,045 A * 5/1999 Giannarelli ........... E04H 13/006 52/141
6,347,439 B1 * 2/2002 Bach Lahor .......... E04H 13/006 52/134
6,414,663 B1 * 7/2002 Manross, Jr. ........ G09G 3/3611 52/103
6,553,727 B2 * 4/2003 Thomas ................ E04H 13/006 52/27
6,578,323 B1 * 6/2003 Zartman ............... E04H 13/006 52/129
6,735,831 B1 * 5/2004 Greiwe .............. A61G 17/0106 40/724
7,171,733 B2 * 2/2007 Min ...................... E04H 13/006 27/35
7,318,262 B1 * 1/2008 Florea ................ A61G 17/0136 40/725
7,415,800 B2 * 8/2008 Stienwand ............ E04H 13/006 27/35
7,609,506 B2 * 10/2009 Aguirre ................. G06F 1/1635 361/679.02
7,647,732 B2 * 1/2010 Rickards ............. E04F 13/0814 52/509
7,739,776 B2 * 6/2010 Hume ................... E04H 13/006 27/35
7,926,228 B1 * 4/2011 Snow .................... E04H 13/008 27/35
8,161,694 B1 * 4/2012 Frost ....................... E04H 13/00 52/142
8,196,275 B2 * 6/2012 Wessel ............... A61G 17/0405 40/124.5
8,438,794 B2 * 5/2013 Eickhof ................ E04H 13/006 52/510
8,510,921 B2 * 8/2013 Florea .................... A61G 17/04 40/725
8,844,102 B2 * 9/2014 Giannetti ............... A61G 17/08 27/1
8,894,160 B1 * 11/2014 Christensen ....... A47B 87/0276 312/138.1
9,051,752 B1 * 6/2015 Muthusami ........... E04H 13/006
2004/0085337 A1 * 5/2004 Barrows ............... E04H 13/003 715/717
2007/0033885 A1 * 2/2007 Freeman ............... E04H 13/006 52/103
2007/0152549 A1 * 7/2007 Champagne ........... A61G 17/08 312/245
2008/0078074 A1 * 4/2008 McCampbell ........ E04H 13/006 27/1
2009/0039742 A1 * 2/2009 Ripley, Jr. ............... A47F 3/004 312/114
2009/0282752 A1 * 11/2009 Stilnovich ............. E04H 13/006 52/133
2010/0102685 A1 * 4/2010 Ward ........................ A47F 3/00 312/223.5
2010/0146750 A1 * 6/2010 Dannenberg ........... A61G 17/04 27/1
2010/0158478 A1 * 6/2010 Gomez, Jr. ........... E04H 13/003 52/103
2010/0162639 A1 * 7/2010 Adair ..................... G06Q 50/18 705/26.1
2010/0300016 A1 * 12/2010 Eickhof ................ E04H 13/006 52/587.1
2011/0030289 A1 * 2/2011 Rossi .................... E04H 13/006 52/133
2013/0199111 A1 * 8/2013 Eickhof ................ E04H 13/006 52/134
2013/0332563 A1 * 12/2013 Yuen ......................... E04H 3/00 709/217

* cited by examiner

PATRON-ACCESSIBLE MEMORIALIZATION STRUCTURES

CROSS-REFERENCE TO RELATED APPLICATIONS

This application is a continuation of U.S. Non-Provisional patent application Ser. No. 17/563,240 filed Dec. 28, 2021, now U.S. Pat. No. 11,591,818, issued Feb. 28, 2023, which is a continuation of U.S. Non-Provisional patent application Ser. No. 14/639,315 filed Mar. 5, 2015, which claims priority to and the benefit of U.S. Provisional Application No. 61/948,524, filed on Mar. 5, 2014, the contents of which are each incorporated by reference herein in their entirety.

BACKGROUND

Traditional burial and entombment structures ("memorialization structures") are generally formed from static, permanent elements that are fixed at the time of installation or very shortly thereafter. Purchasers of memorialization structures and individuals associated with the deceased are increasingly interested in the ability to personalize memorialization structures at the time of purchase as well as after installation. One conventional method for personalization includes placing objects, such as mementos and flowers, on or around the memorialization structure. However, such a method leaves the objects exposed to the elements and accessible to the general public. Another conventional method for personalization of entombment structures, such as crypts and mausoleums, is to place personal objects, such as photographs, within a sealed recess of the structure visible from the outside. Although such recesses allow for personalization, the objects placed therein may not be changed after installation without unsealing the recess through potentially costly and time consuming methods, which may also unseal and expose recesses of adjacent entombment structures. Accordingly, the memorialization industry may benefit from a memorialization structure configured to provide access to purchasers of the memorialization structure and/or certain select individuals associated with the deceased to allow them to personalize the memorialization structure after installation thereof.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a memorialization structure may include a niche arranged on a front surface of the memorialization structure arranged in a first plane and partially within a cavity defined thereon. The niche may include a front face arranged in a second plane defining an opening, a recess communicating with the opening, a door configured to enclose the recess, and a lock configured to secure the door in a closed position enclosing the recess, the lock being configured to be unlocked via an unlocking mechanism to allow patron access to the recess post-entombment or post-burial of human bodily remains associated with the niche.

In an embodiment, a memorialization niche for installation on a surface of a memorialization structure arranged in a first plane and at least partially within a cavity defined thereon may include a first niche surface configured to be coupled to the surface of the memorialization surface structure, a second niche surface arranged in a second plane and defining an opening, a recess communicating with the opening, a door configured to enclose the recess, and a lock configured to secure the door in a closed position enclosing the recess, the lock being configured to be unlocked via an unlocking mechanism to allow patron access to the recess post-entombment or post-burial of human bodily remains associated with the niche.

In an embodiment, a method of manufacturing a memorialization niche for installation on a front surface of a memorialization structure arranged in a first plane and at least partially within a cavity defined thereon may include providing a first niche surface configured to be coupled to the front surface of the memorialization surface structure, providing a recess communicating with the opening, affixing a door configured to enclose the recess to the niche surface, and installing a lock configured on the door, the lock being configured to secure the door in a closed position enclosing the recess, the lock being configured to be unlocked via an unlocking mechanism to allow patron access to the recess post-entombment or post-burial of human bodily remains associated with the memorialization niche.

BRIEF DESCRIPTION OF THE DRAWINGS

The above and other objects of the present invention will become more readily apparent from the following detailed description taken in connection with the accompanying drawings.

DETAILED DESCRIPTION

Figure 1A:
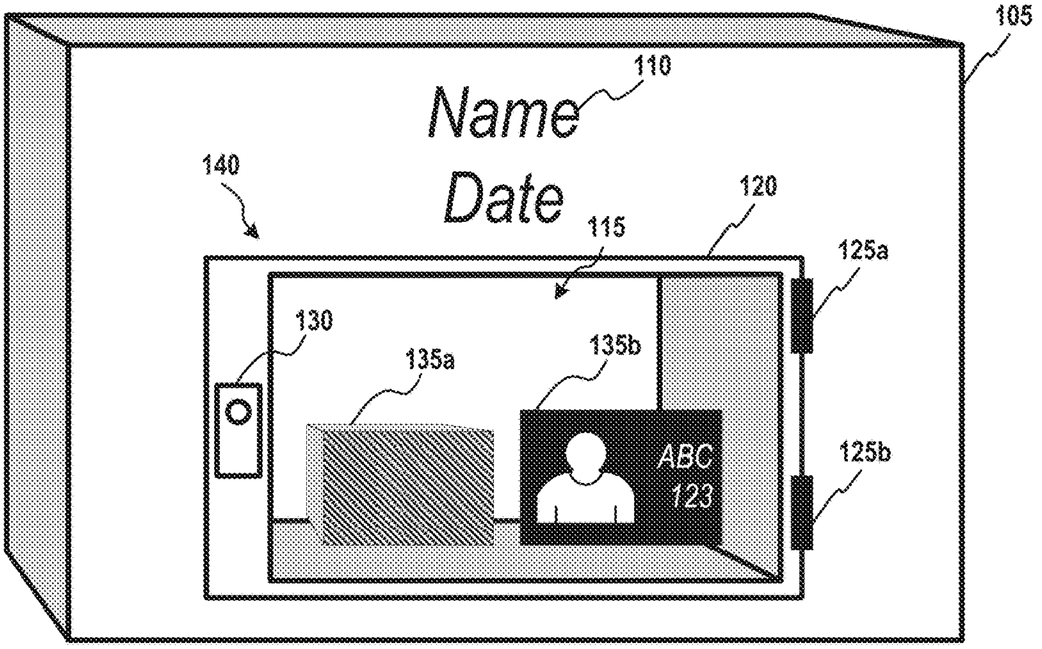
FIGS. 1A and 1B depict an illustrative memorial structure according to a first embodiment.

The described embodiments generally relate to burial and entombment structures ("memorialization structures") having a recess or cavity arranged that is accessible after installation of the memorialization structures and/or post-burial or post-entombment of the deceased. In some embodiments, the recess may be arranged within a niche structure arranged on and/or within a surface of the memorialization structure. In some embodiments, the recess may be formed within a surface of the memorialization structure. Illustrative memorialization structures may include, without limitation, grave stones, grave markers, crypts, mausoleums, columbariums, burial vaults, and cremation niches. Post-burial or post-entombment generally refers to a time period after the human bodily remains of the deceased have been placed in the memorialization structure, buried in a plot associated with the memorialization structure, or a niche configured according to some embodiments.

In general, a patron is a member of the public such as a relative or other loved one of the deceased who may visit the burial or entombment site of a deceased. The patron may be the purchaser of the memorialization structure for the deceased. Customarily, memorialization structures are purchased from a funeral home or cemetery (the “memorial operator”). Certain memorialization structures may include a recess (or “niche”) configured to hold bodily remains, such as cremated bodily remains stored in a cremation urn, and/or personal objects, such as photographs of the deceased. The recess may be sealed via a door. The bodily remains and/or personal objects may be placed in the recess and the recess may be permanently or semi-permanently sealed at the time of installation or very shortly thereafter at the direction of the memorial operator. Traditionally, access to the recess after installation or post-burial or post-entombment of human bodily remains may only be provided by the memorial operator because access may require breaking a seal, such as the seal formed through welding metal components of the recess door and/or concrete and/or removing fasteners affixing the door to a base surrounding the recess, and/or opening an access mechanism that also opens adjacent recesses, such as adjacent recesses in a columbarium.

In some embodiments, a memorialization structure may include a niche having a recess arranged therein. In some embodiments, the niche may be arranged within a base of the memorialization structure. In some embodiments, the memorialization structure may be configured to store non-cremated full-body remains, such as within a casket or coffin. In such an embodiment, the niche may be used as or as part of a marker for the casket or coffin, for example, of a mausoleum, columbarium, burial vaults, grave marker, headstone, or the like. The recess may be sealed and locked via a door having a locking mechanism configured to secure the contents of the recess and to provide a patron with access (“patron access”) to the recess after installation (or post-burial or post-entombment) of the memorial structure. In this manner, a patron may remove objects from and/or insert objects into the recess post-burial or -entombment of the deceased without disturbing the memorialization structure and/or adjacent memorialization structures and/or requiring a memorial operator to unseal the recess. Accordingly, the patron may continually update the personalization effects of a memorialization structure and achieve a dynamic memorial for the deceased while maintaining the security of any bodily remains and/or personal objects stored in the recess.

Figure 1B:
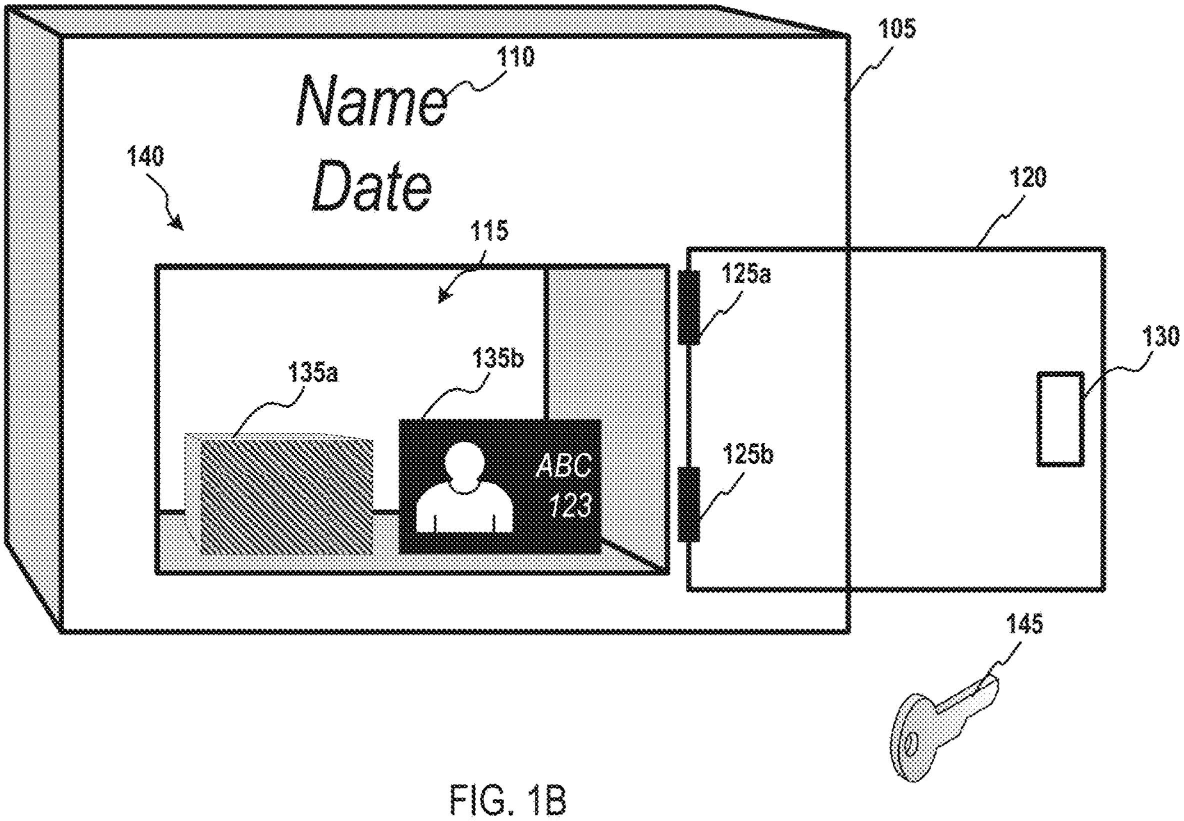

FIGS. 1A and 1B depict an illustrative memorialization structure according to a first embodiment. As shown in FIG. 1A, a memorialization structure 105 may include indicia 110 providing information about the deceased associated with the memorialization structure, such as the name of the deceased and their birth and death dates. The memorialization structure 105 and/or components thereof (for example, the door 120 of niche 140) may be formed from any material known to those having ordinary skill in the art, including, without limitation, stone, marble, limestone, cement, mortar, metal, metal alloys, bronze, steel, glass, plexiglass, or any combination thereof. A niche 140 may be arranged on and/or formed within the memorialization structure (for example, within a base surface thereof). The niche 140 may include a recess 115 that is disposed within the memorialization structure 105. The recess 115 may be sealed by a door 120 hingedly affixed to the niche 140 and/or the memorialization structure 105 via one or more hinges 125*a*, 125*b*. The door 120 may include a locking mechanism 130 configured to lock the door 120 and prevent access to the recess 115. The locking mechanism 130 may include any type of locking mechanism now known to those having ordinary skill in the art or developed in the future. In some embodiments, the door 120 may include a sealing structure (not shown) configured to seal the recess 115 from water and/or air or other gasses (for example, to provide an “air-tight” and/or “water-tight” seal). The sealing structure may be formed using materials known to those having ordinary skill in the art, including, without limitation, rubber and/or silicon. The niche 140 and/or components thereof may be formed from any material known to those having ordinary skill in the art, including, without limitation metal, metal alloys, bronze, steel, glass, plexiglass, or any combination thereof.

In some embodiments, the locking mechanism 130 may include a lock-and-key locking mechanism that may be locked and/or unlocked via a key 145. In some embodiments, the locking mechanism 130 may include an electronic locking mechanism, such as an electronic keypad locking mechanism, a biometric locking mechanism (for example, a biometric fingerprint lock), a voice-recognition locking mechanism, an iris-scanning locking mechanism, a password-based locking mechanism, or any other type of electronic locking mechanism now known or developed in the future. In some embodiments, the locking mechanism may include an electronic, computer/hardware-based or software-based mechanism that may be unlocked or otherwise controlled via software, such as through a password, a smartphone application (or “app”), and/or a communication connection (for instance, Bluetooth, near field communication, infrared, or the like).

The recess 115 may be configured to hold one or more objects 135*a*, 135*b*, including, without limitation, personal objects (for example, photographs, mementos, writings, medals, commemorative objects, flowers, or the like) and/or bodily remains (for example, cremated bodily remains in a cremation urn or similar cremation storage device). In some embodiments, the one or more objects 135*a*, 135*b* may include electronic media and/or an electronic device configured to play electronic media, such as a DVD player, Blu-ray™ player, a CD player, a computing device, or any other type of electronic media, electronic device and/or computing device now known or developed in the future. In some embodiments, the niche 140 and/or the one or more objects 135*a*, 135*b* may include and/or may be operably coupled with an electronic media system configured to play electronic media at the memorialization structure 105, such as playing a video and/or music and/or presenting digital pictures through speakers and/or a display device at the memorialization structure responsive to detecting a visitor to the memorialization structure and/or through user-activation. Accordingly, a patron may access the one or more objects 135*a*, 135*b* in the recess 115 to change, modify, and/or otherwise update the electronic media presented by the electronic media system.

In some embodiments, the door 120 may include a transparent portion such that the one or more objects 135*a*, 135*b* may be visible from outside of the recess 115 when the door is closed and locked. In some embodiments, the transparent portion may be formed from glass, plastic, transparent thermoplastics, poly(methyl methacrylate), and/or other transparent materials known to those having ordinary skill in the art. In some embodiments, the door 120 may be formed from non-transparent materials such that the one or more objects 135*a*, 135*b* are not visible from the outside of the recess 115 when the door is closed and locked.

In some embodiments, the memorial operator may provide the patron and or certain other designated individuals with a key 145 or other process (for example, a passcode for a computer-implemented locking mechanism 130) for unlocking the locking mechanism after installation of the memorialization structure. As shown in FIG. 1B, a patron may unlock the door 120 via the locking mechanism 130 and may access the recess and the one or more objects 135*a*, 135*b* stored therein. As such, the contents of the recess 115 may remain secure from access and/or tampering by the general public and from the effects of the environment, while also being easily accessible to the patron of the memorialization structure 105 to dynamically personalize the memorialization structure post-burial or entombment.

Figure 2:
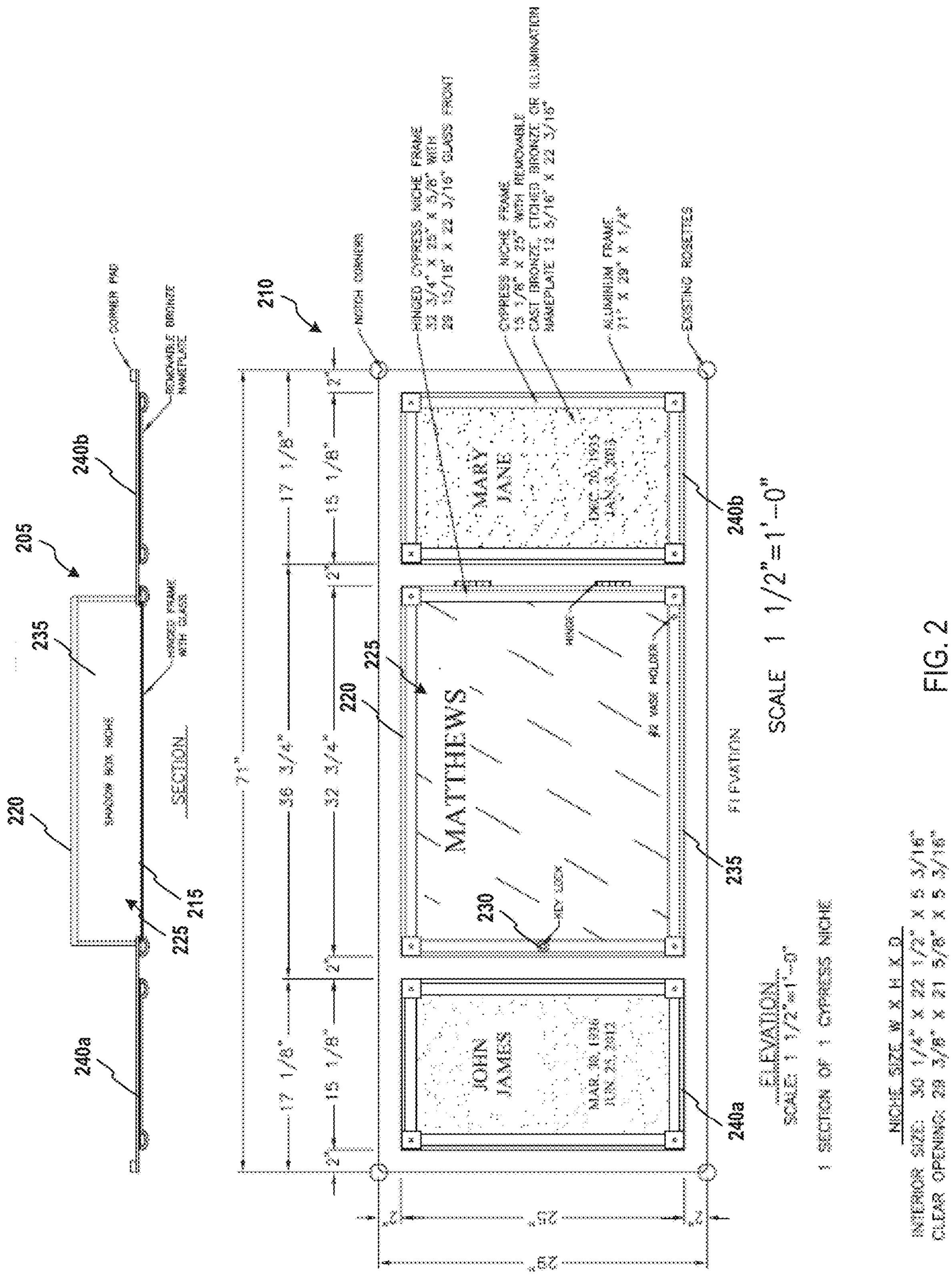
FIG. 2 depicts a schematic diagram of an illustrative memorialization structure according to a second embodiment.

FIG. 2 depicts a schematic diagram of an illustrative memorialization structure according to a second embodiment. As shown in FIG. 2, a memorialization structure 215 may have a niche or "shadow box" niche 235 mounted thereto on a front surface thereof arranged in a first plane and at least partially within a cavity defined thereon. The niche 235 may include a front face defining an opening and arranged in a second plane, and a recess 225 communicating with the opening and sealed by a door 220. In some embodiments, the door 220 may be configured as a hinged-frame with a glass front. The niche 235 may include one or more display components 240*a* and 240*b*. In some embodiments, the one or more display components 240*a* and 240*b* may be removably affixed to the niche 235 and/or the memorialization structure 215, for instance, through fasteners. The one or more display components 240*a* and 240*b* may be configured as and/or to hold nameplates, pictures, or other design elements.

The memorialization structure 215 is depicted in FIG. 2 in a top-down view 205 and a front view 210. As shown in the top-down view 205, the niche 235 may extend out (or "overhang") from a mounting surface of the memorialization structure 215. The door 220 may include a locking mechanism 230 configured to allow a patron to lock and unlock the door and access the recess 225. In some embodiments, the niche 235 may be configured to be installed on existing memorialization structures 215 (for instance, may be "retrofitted" to existing memorialization structures). In some embodiments, the niche 235 or portions thereof may be configured to be installed on a surface of a memorialization structure 215 through the use of fasteners, adhesives, concrete, mortar, and/or combinations thereof. In some embodiments, the niche 235 or portions thereof may be configured to be installed on a front surface of a memorialization structure 215 through the use of fasteners covered by rosettes.

Figure 3:
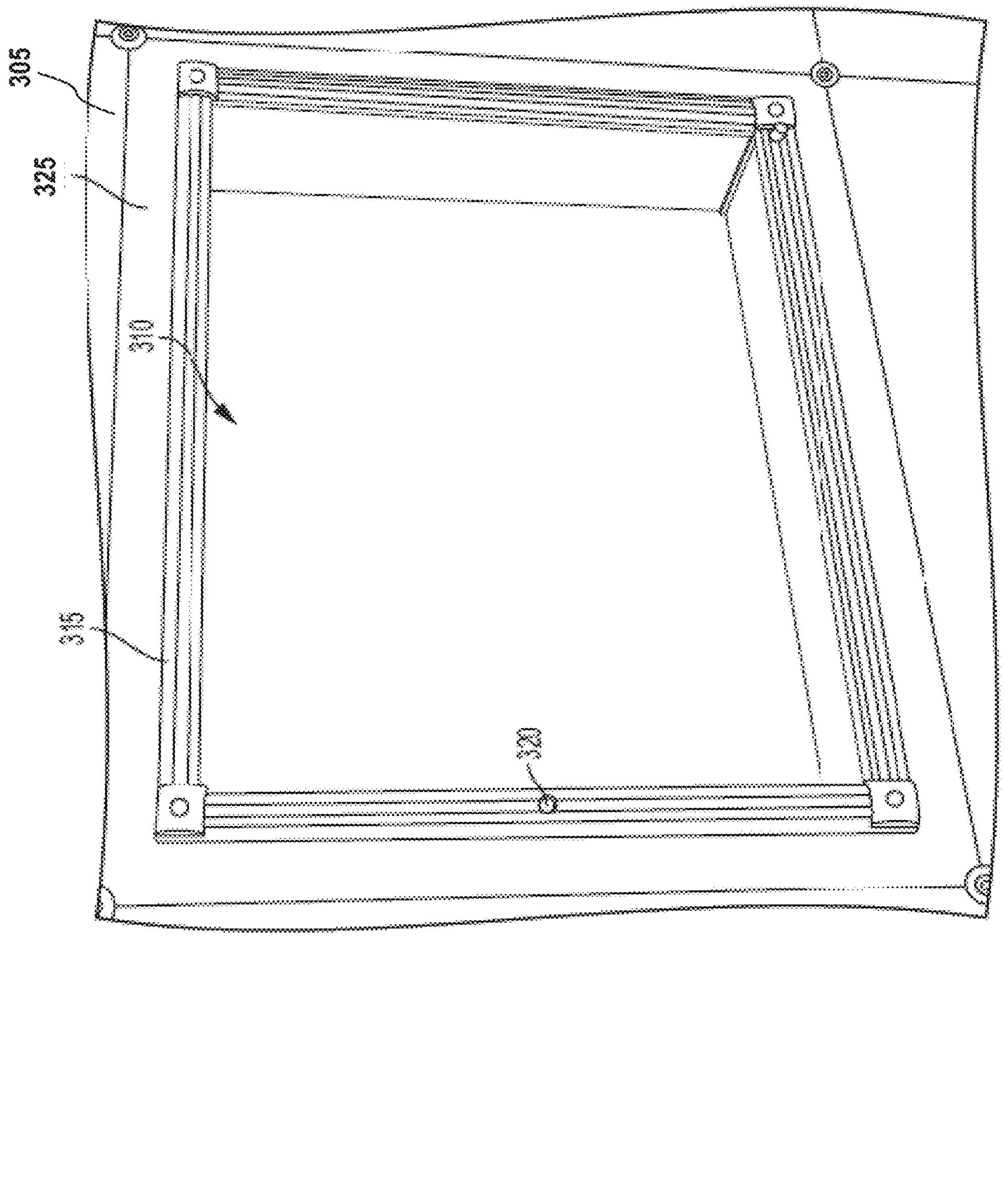
FIG. 3 depicts an illustrative memorial structure according to a third embodiment.

FIG. 3 depicts an illustrative memorialization structure according to a third embodiment. As shown in FIG. 3, a memorialization structure 305 may include a niche 325 mounted thereto. In some embodiments, a cavity may be formed or otherwise made in a surface of the memorialization structure 305 that is configured to receive the niche 325 or a portion thereof. In some embodiments, the niche 325 may be installed on a surface of the memorialization structure 305 such that at least a portion of the niche 325 extends beyond (or "overhangs") the surface of the memorialization structure. The niche 325 may include a recess 310 sealed by a door 315, which may include a locking mechanism 320 configured to allow a patron to lock and unlock the door and access the recess. The door 315 may have a front surface formed from glass or another transparent or semi-transparent material, allowing objects stored in the recess to be visible from the outside.

Figure 4:
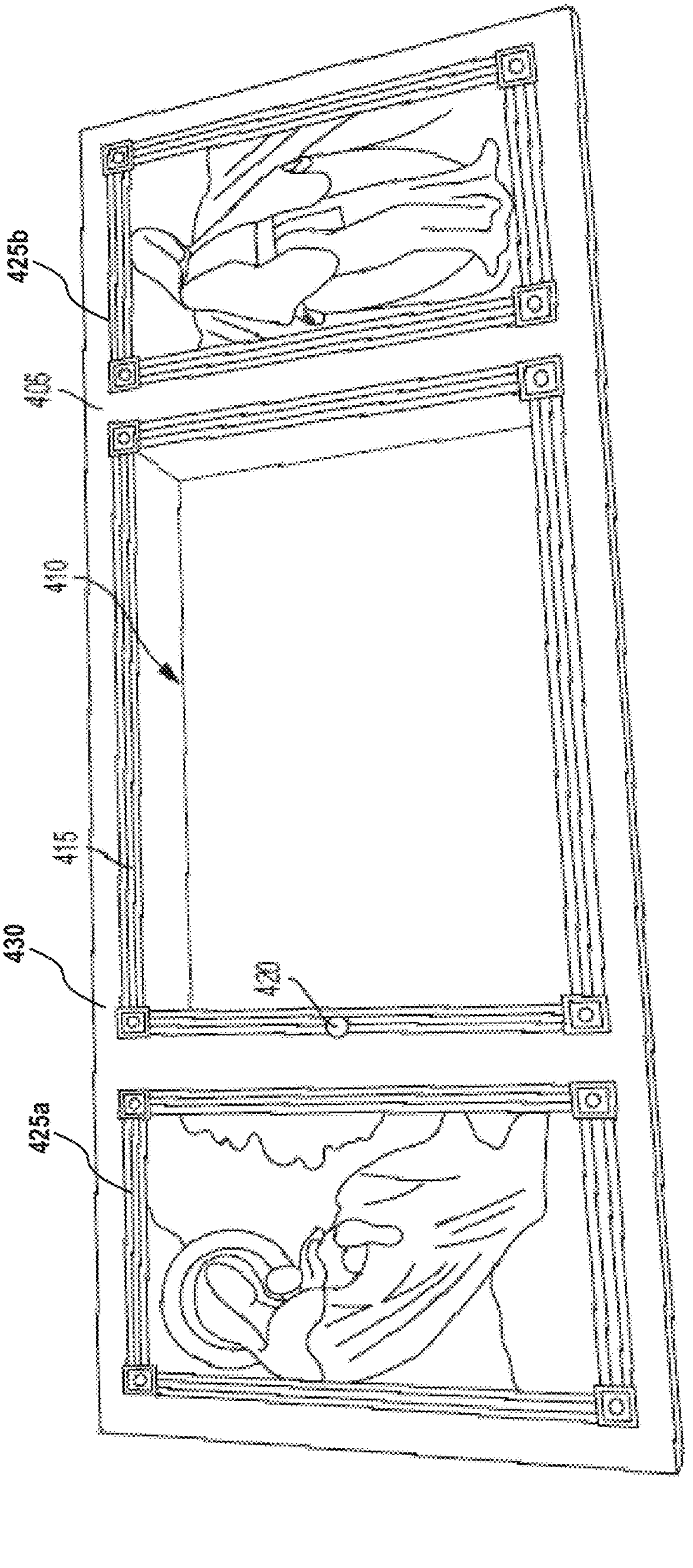
FIG. 4 depicts an illustrative memorial structure according to a fourth embodiment.

FIG. 4 depicts an illustrative niche according to a fourth embodiment. As shown in FIG. 4, a niche 405 may include a recess 410 sealed by a door 415 having a locking mechanism 420 configured to allow a patron to lock and unlock the door and access the recess. In some embodiments, the niche 405 may include one or more display components 425*a* and 425*b* that may be configured to hold, display, or otherwise present design elements, such as pictures, engravings, mementos, and/or media presentation devices (i.e., a display device for digital media content). In some embodiments, the niche 405 may include a niche surface 430 configured to support the niche 405 and the one or more display components 425*a* and 425*b*. In some embodiments, the niche 405 may be attached to the memorialization structure by affixing the niche surface 430 or portions thereof to a surface of a memorialization structure. In some embodiments, the niche 405 or portions thereof may be formed from bronze and other materials known to those having ordinary skill in the art.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A memorialization assembly comprising:

a memorialization structure selected from a grave stone, a grave marker, a crypt, a mausoleum, a columbarium, a burial vault, and a cremation niche, wherein the memorialization structure comprises a front surface arranged in a first plane and defining a cavity thereon;

a niche arranged on the front surface of the memorialization structure and at least partially within the cavity, the niche comprising:

a niche front face defining an opening, wherein the niche front face is arranged in a second plane substantially parallel to the first plane, a recess extending across the first plane to the second plane to communicate with the opening, wherein the recess is configured to retain therein a plurality of objects consisting of at least one personal object and bodily remains, and a lock configured to secure a door in a closed position enclosing the recess, the lock being configured to be selectively locked and unlocked via a secure access locking mechanism to permit restricted patron access to the recess post-entombment or post-burial of human bodily remains associated with the niche.

2. The memorialization assembly of claim 1, further comprising a door configured to seal the opening to enclose the recess, wherein at least a portion of the door is transparent or semi-transparent, thereby providing visual access to at least one of the plurality of objects held in the recess.

3. The memorialization assembly of claim 1, wherein the niche further comprises a niche back face configured to couple the niche to the memorialization structure.

4. The memorialization assembly of claim 1, further comprising at least one display component affixed to the niche front face, the at least one display component being configured to hold at least one design element.

5. The memorialization assembly of claim 1, wherein the lock is selected from the group consisting of an electronic keypad locking mechanism, a biometric locking mechanism, a voice-recognition locking mechanism, an iris-scanning locking mechanism, and a software-controlled locking mechanism.

6. The memorialization assembly of claim 1, further comprising an electronic media system arranged within the recess and comprising a display device visible through the opening, the electronic media system being configured to present at least one of at least one video and at least one digital picture via the display device.

7. The memorialization assembly of claim 1, wherein the recess is configured to store cremated human bodily remains disposed within a cremation storage device.

8. The memorialization assembly of claim 1, wherein the memorialization structure is configured to store non-cremated, full-body remains entombed within an entombment cavity arranged within the memorialization structure.

9. A memorialization niche for installation on a front surface of a memorialization structure, wherein the front surface is arranged in a first plane, the memorialization niche comprising:

a first niche surface configured to contact and couple to the front surface of the memorialization structure;

a second niche surface, opposite the first niche surface, defining an opening, wherein the second niche surface is arranged in a second plane substantially parallel to the first plane;

a recess extending a distance between the first plane and the second plane to communicate with the opening, wherein the recess is configured to retain therein a plurality of objects consisting of at least one personal object and bodily remains, and a lock configured to secure a door in a closed position enclosing the recess, the lock being configured to be selectively locked and unlocked via a secure access locking mechanism to permit restricted patron access to the recess post-entombment or post-burial of human bodily remains associated with the memorialization niche;

wherein the memorialization structure is selected from a grave stone, a grave marker, a crypt, a mausoleum, a columbarium, a burial vault, and a cremation niche.

10. The memorialization niche of claim 9, further comprising a door configured to seal the opening to enclose the recess, wherein at least a portion of the door is transparent or semi-transparent, thereby providing visual access to at least one of the plurality of objects held in the recess.

11. The memorialization niche of claim 9, further comprising at least one display component affixed to the memorialization niche, the at least one display component being configured to hold at least one design element.

12. The memorialization niche of claim 9, wherein the lock is selected from the group consisting of an electronic keypad locking mechanism, a biometric locking mechanism, a voice-recognition locking mechanism, an iris-scanning locking mechanism, and a software-controlled locking mechanism.

13. A method of manufacturing a memorialization niche for installation on a front surface of a memorialization structure, wherein the front surface is arranged in a first plane, the method comprising:

providing a first niche surface configured to contact and couple to the front surface of the memorialization structure;

providing a second niche surface, opposite the first niche surface, defining an opening, wherein the second niche surface is arranged in a second plane parallel to the first plane;

providing a recess extending a distance between the first plane and the second plane to communicate with the opening, wherein the recess is configured to retain a plurality of objects consisting of at least one personal object and bodily remains; and installing a lock on a door, the lock configured to secure the door in a closed position enclosing the recess, the lock being configured to be selectively locked and unlocked via a secure access locking mechanism to permit restricted patron access to the recess post-entombment or post-burial of human bodily remains associated with the memorialization niche;

wherein the memorialization structure is selected from a grave stone, a grave marker, a crypt, a mausoleum, a columbarium, a burial vault, and a cremation niche.

14. The method of claim 13, further comprising affixing a door configured to seal the opening to enclose the recess to the second niche surface, wherein at least a portion of the door is transparent or semi-transparent, thereby providing visual access to at least one of the plurality of objects held in the recess.

15. The method of claim 13, further comprising providing at least one display component configured to be affixed to the memorialization niche, the at least one display component being configured to hold at least one design element.

16. The method of claim 13, wherein the lock is selected from the group consisting of an electronic keypad locking mechanism, a biometric locking mechanism, a voice-recognition locking mechanism, an iris-scanning locking mechanism, and a software-controlled locking mechanism.

* * * * *